United States Patent
Nagendra et al.

(10) Patent No.: US 7,698,561 B2
(45) Date of Patent: Apr. 13, 2010

(54) METHOD AND SYSTEM FOR DETECTION OF ALIASES IN A NETWORK

(75) Inventors: Ps Nagendra, Bangalore (IN); Vishnu Ls Kiran, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 918 days.

(21) Appl. No.: 10/917,604

(22) Filed: Aug. 12, 2004

(65) Prior Publication Data

US 2006/0036866 A1 Feb. 16, 2006

(51) Int. Cl.
*H04L 9/32* (2006.01)
*G06F 7/04* (2006.01)

(52) U.S. Cl. .......................... 713/181; 726/6
(58) Field of Classification Search ................. 713/181; 726/5, 6, 18
See application file for complete search history.

(56) References Cited

U.S. PATENT DOCUMENTS

| | | | |
|---|---|---|---|
| 5,724,510 A | 3/1998 | Arndt et al. | |
| 6,061,350 A | 5/2000 | Min | |
| 6,463,533 B1* | 10/2002 | Calamera et al. | 713/163 |
| 7,095,321 B2* | 8/2006 | Primm et al. | 340/540 |
| 7,152,242 B2* | 12/2006 | Douglas | 726/23 |
| 7,240,364 B1* | 7/2007 | Branscomb et al. | 726/9 |
| 2002/0053018 A1* | 5/2002 | Ota et al. | 713/1 |
| 2002/0116485 A1 | 8/2002 | Black et al. | |
| 2005/0165834 A1* | 7/2005 | Nadeau et al. | 707/103 R |

OTHER PUBLICATIONS

Schoenwaelder, Juergen, "Scotty Frequently Asked Questions, Edition 2. for Scotty version 2.1.11", 10 pages, Jun. 26, 2002.
J. Galvin, et al., "SNMP Security Protocols" Network Working Group, Request for Comments: 1352, 41 pages, Jul. 1992.
Scotty Frequently Asked Questions; Edition 2, for Scotty version 2.1.11 obtained at http://www.ibr.cs.tu-bs.de/users/ schoenw/scotty/faq/faq.html#SEC31; Jun. 26, 2002, 11 pages.

* cited by examiner

*Primary Examiner*—Kimyen Vu
*Assistant Examiner*—Suman Debnath
(74) *Attorney, Agent, or Firm*—Trellis IP Law Group, PC (57) ABSTRACT

The invention provides a method and system of detecting aliases in a network. The network comprises at least one device and at least one Network management system (NMS) for managing the devices. The NMS identifies each device available in the network with a message digest. The NMS retrieves the message digest of a device that is submitted for management. The NMS tries to locate the retrieved message digest with a database of message digests. In case the retrieved message digest is located on the database, the NMS declares the device as an alias. However, if the message digest is not located on the database, the NMS stores the message digest in the database and starts managing the device.

18 Claims, 9 Drawing Sheets

METHOD AND SYSTEM FOR DETECTION OF ALIASES IN A NETWORK

BACKGROUND OF THE INVENTION

1. Field of the Invention

The present invention relates, in general, to network management. More specifically, embodiments of the present invention relate to systems and methods for detecting aliases in a network of devices.

2. Description of Background Art

One of the purposes of a Network Management System (NMS) is to manage devices located on a network. The NMS needs to perform checks before initiating management of a device to verify if a device is an alias or not.

Various techniques are available in the art to detect aliases in a network. One of these techniques is based upon a duplication detection algorithm. According to the alias detection procedure implementing this algorithm, a user submits a device for management to the NMS. The NMS interacts with the device and collects data (e.g., such as IP address, Media Access Control (MAC) address, sysdesc, sysOID, atnetaddress, etc) for managing the device via Simple Network Management Protocal (SNMP) and stores collected data in its database. When a second device is submitted for management, the data for managing the second device is collected by the NMS and compared with the existing collected data of every other device that is already being managed by the NMS to determine whether the second device is an alias or not. The alias detection algorithm technique enables detection of an alias with considerable accuracy, but it requires a large amount of resources and takes a lot of time. In particular, when there are a few thousand devices to be managed, the time required for running the algorithm increases incrementally with the addition of a new device to the database.

Another technique known in the art, which provides better performance than the alias detection algorithm technique, uses an IP address to identify a device in the process of detecting aliases in the network. This technique requires lesser processing time, as the comparison is based only upon one parameter, i.e., the IP address. However, this technique is incapable of ensuring accuracy while detecting aliases. Also, this technique does not necessarily decrease the number of instances of inventory collection, which consumes most of the time. This technique may also use some other parameter, such as the MAC address, to identify if a device is an alias or not. However, the MAC address is also a variable identifier and may change with the inclusion of a new module in the device.

SUMMARY OF EMBODIMENTS OF THE INVENTION

In one embodiment, the invention provides a method of detection of aliases in the network. The detection of aliases is based upon a message digest computed for each device in the network. The message digest is computed after processing a set of Object Identifiers (OIDs) associated with the device. More specifically, the message digest is computed on values of a set of Object Identifiers that are retrieved from the device. A Network Management System (NMS) retrieves the message digest from the device. The NMS locates the retrieved message digest in a database of message digests. If the retrieved message digest is located on the database of message digest, the NMS declares the device an alias. However, if the message digest is not located on the database, the NMS stores the message digest in the database and starts managing the device.

In another embodiment, the invention provides a method to identify a man-in-middle by taking over the communication in a network. The man-in-middle tries to attack the network by using false identification for a device in the network. The NMS identifies the man-in-middle after computing the message digest associated with the man-in-middle and comparing the computed message digest with the message digests available in its database. The NMS declares the network as being attacked if the message digest of the man-in-middle is not available in the database.

In a further embodiment, the invention provides a system for the detection of aliases in the network. The system comprises a retrieving module, a locating module, and a declaring module. The retrieving module retrieves a message digest for an NMS. The locating module locates the retrieved message digest in a database of message digests. The declaring module declares the device as an alias if the retrieved message digest is located on the database of message digests.

Further embodiments of the present invention provide an apparatus for detecting aliases in a network having at least one device and at least one network management system (NMS). The apparatus comprises a processor, and a machine readable medium including one or more of the following instruction means executable by the processor: (i) one or more instruction means for requesting a device for a message digest which may be computed by using values of a set of object identifiers (OIDs) associated with the device; (ii) one or more instruction means for retrieving the message digest from the device; (iii) one or more instruction means for locating the retrieved message digest in a database of message digests located on the requesting NMS; and (iv) one or more instruction means for declaring the device as an alias if the retrieved message digest is located on the database. Additional embodiments of the present invention provide a machine-readable medium including one or more of the foregoing instructions executable by the processor.

Further additional embodiments of the present invention provide a computer data signal embodied in a carrier wave comprising an alias detection signal, wherein the alias detection signal is used for detecting aliases on the basis of a message digest. The message digest is an identifier to a device and may be computed using a set of object identifiers (OIDs) associated with the device.

These provisions, together with the various ancillary provisions and features which will become apparent to those artisans, possessing skill in the art, as the following description proceeds, are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

The invention provides a method, a system, and a computer program product for detecting aliases in a network. The method and system comprise a plurality of devices and at least one Network Management System (NMS) to manage the devices. The method and system involve identifying each device available in the network with a message digest. A message digest is computed on values of a set of Object Identifiers (OIDs) that are retrieved from the device. An OID (e.g., ifDescr, ifIndex, ifType, ifSpeed, ifPhysAddress, atNetAddress, sysDesc and sysOID) is a formal description of a set of network objects. This is defined as part of the Simple Network Management Protocol (SNMP) specifications which is an industry standard.

For various embodiments of the present invention, a device calculates a message digest on receiving instructions from the NMS. Since the NMS knows what data it wants to collect from a device, the NMS collects data by placing or transmitting one or more SNMP requests to the device. Broadly, the NMS would register a set of OIDs inside the device for the purposes of the device computing a message digest. More specifically, the NMS registers a set of OIDs in a Management Information Base (MIB), a data base such as CISCO-EVENT MIB, associated with a device, and the device computes a message digest by use of an algorithm (e.g., the MD5 algorithm Which will be further identified and explained hereinafter). The device monitors for changes in values for any of the OIDs registered in the MIB associated with the device. If the device detects a change in value(s) of any of the OIDs, it updates the SNMP of the changed event, such as by means of a trap, syslog message, etc. The NMS on receiving a trap or a syslog message from the device, would query the MIB (e.g., the CISCO-EVENT-MIB) associated with the device to retrieve the registered set of OIDs from the MIB. The NMS may then place the SNMP requests against the device to retrieve values for these OIDs, and the NMS in combination with the device would then compute the message digest through the use of any means, such as any suitable algorithm.

The device also updates the NMS about the OIDs for computation of the message digest by the NMS. The message digest may then be compared with a database of message digest located on the NMS. If the message digest is located on the database, the NMS declares the device as an alias. However, in case the message digest is not located on the database, the NMS stores the message digest in the database and starts managing the device.

Figure 1:
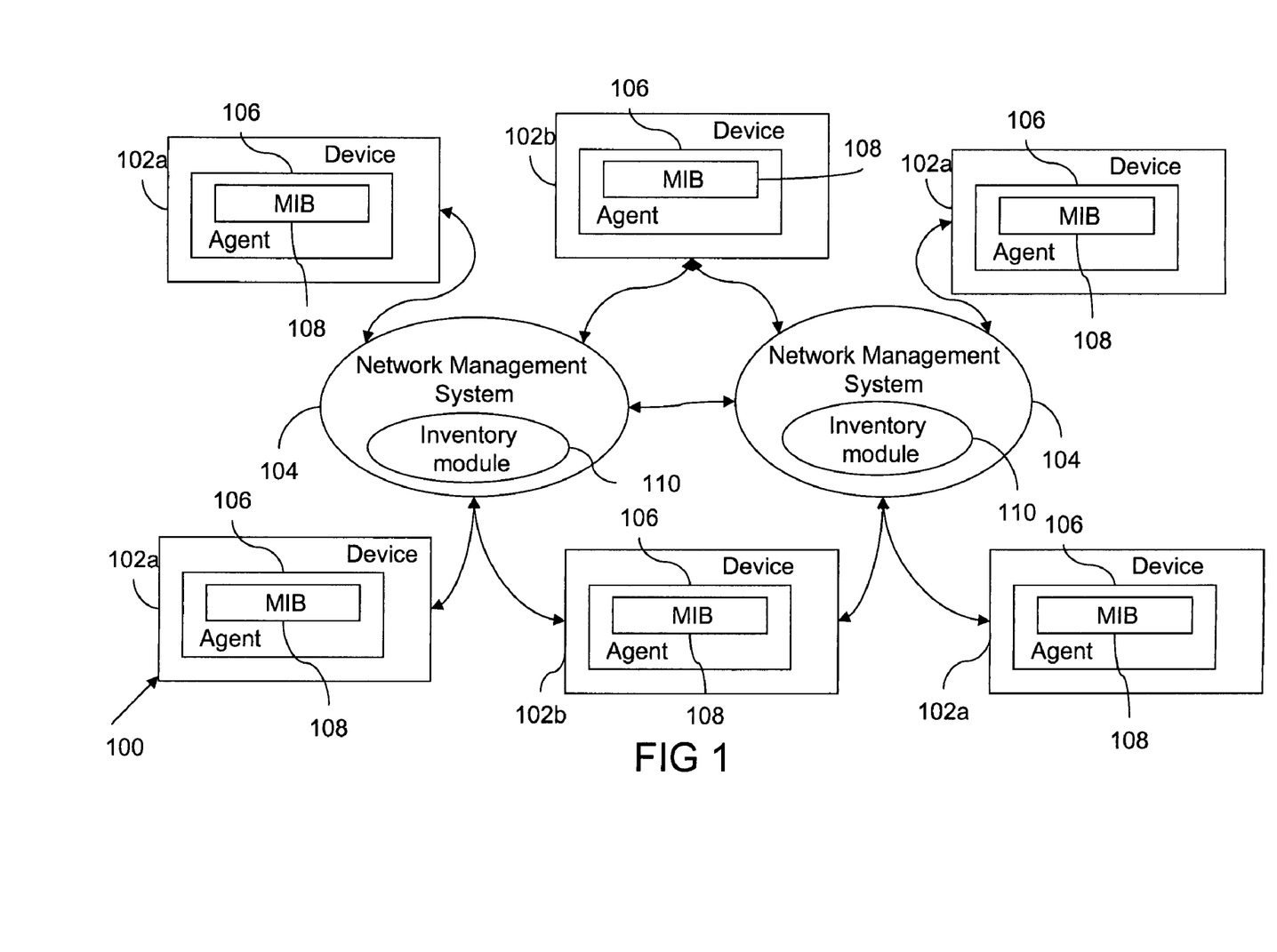
FIG. 1 depicts a general environment for the invention wherein the environment includes a network with a plurality of devices and network management systems.

FIG. 1 depicts a general environment in which embodiments of the invention function. As shown in the figure, a network 100 comprises a plurality of devices 102 and a plurality of NMS 104. Devices 102 include data processing units such as a processor, PDA, etc. Each device 102 includes an agent 106 that enables communication with NMS 104. Agent 106 is a software module in device 102, which is responsible for maintaining local management information and delivering that information to NMS 104 via a network management protocol. A management information exchange can be initiated by NMS 104 (via polling) or by agent 106 (via a trap). Agents 106 function as collection units that gather and send data regarding the managed resources in response to a request from NMS 104. Agent 106 includes a Management Information Base (MIB) 108. MIB 108 is a database that describes application parameters such as hardware, configuration parameters, and the performance statistics, which directly relate to the current operation of the device. Each NMS 104 is capable of managing one or more devices 102. The management involves identification of the devices 102 and the network elements associated with each managed device 102. NMS 104 monitors the managed devices 102 and ensures that the devices 102 operate optimally on the network 100. Each device 102 is managed by at least one NMS 104. For example, a device 102a is managed by a single NMS 104 while device 102b may be managed by a multiple number of NMS 104.

For various embodiments of the present invention, a device may be referred to as an alias when it has already been managed by an NMS and a user submits the same device for management a second time to the same NMS. This may happen when a device has multiple IP addresses and the NMS is already managing it by one IP address (e.g., IP address A) and the user submits the same device with a different IP address (e.g., IP address B) for management, or the device is being managed by using its hostname and the same device is submitted for management by providing one of its IP addresses.

Figure 2:
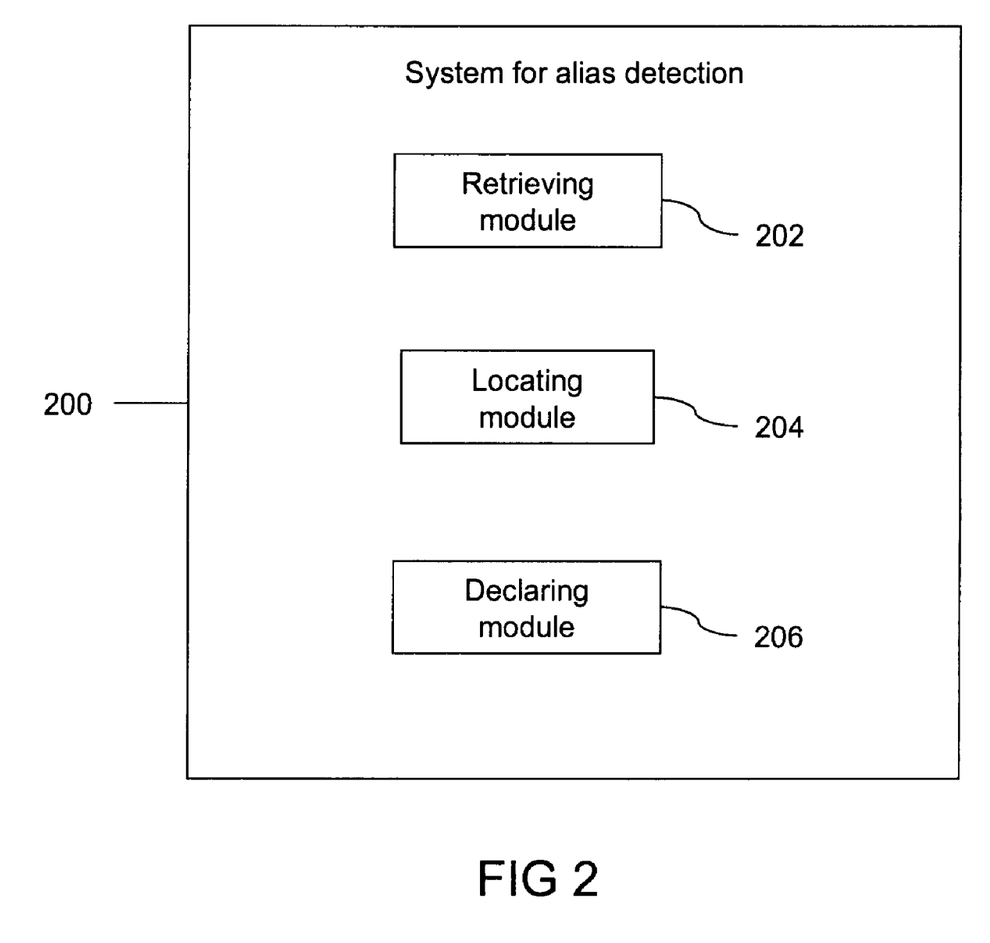
FIG. 2 is a schematic block diagram illustrating a system of detecting aliases in the network, in accordance with an embodiment of the invention.

FIG. 2 depicts a block diagram of a system 200 of detecting aliases in network 100. System 200 comprises a retrieving module 202, a locating module 204 and a reporting module 206.

Retrieving module 202 retrieves a message digest from device 102 in response to a request from at least one NMS 104 to manage device 102. The message digest (e.g., CiscoMsgDigest) may be stored as a MIB value in a new MIB element that may be created. Retrieving this value from the device comprises placing an SNMP request to the device for this MIB element. The SNMP response would contain the MIB value.

Locating module 204 locates the retrieved message digest in a database of message digests stored in requesting NMS 104. Declaring module 206 declares device 102 as an alias if the retrieved message digest is located on a database of message digests in the NMS 104.

The presence of the message digest associated with device 102 in the database of one NMS 104 implies that device 102 is already being managed by one of NMS 104. The details of the various modules (e.g., retrieving module 202, locating module 204, and declaring module 206) of the alias detecting system 200 are described hereinafter.

Figure 3:
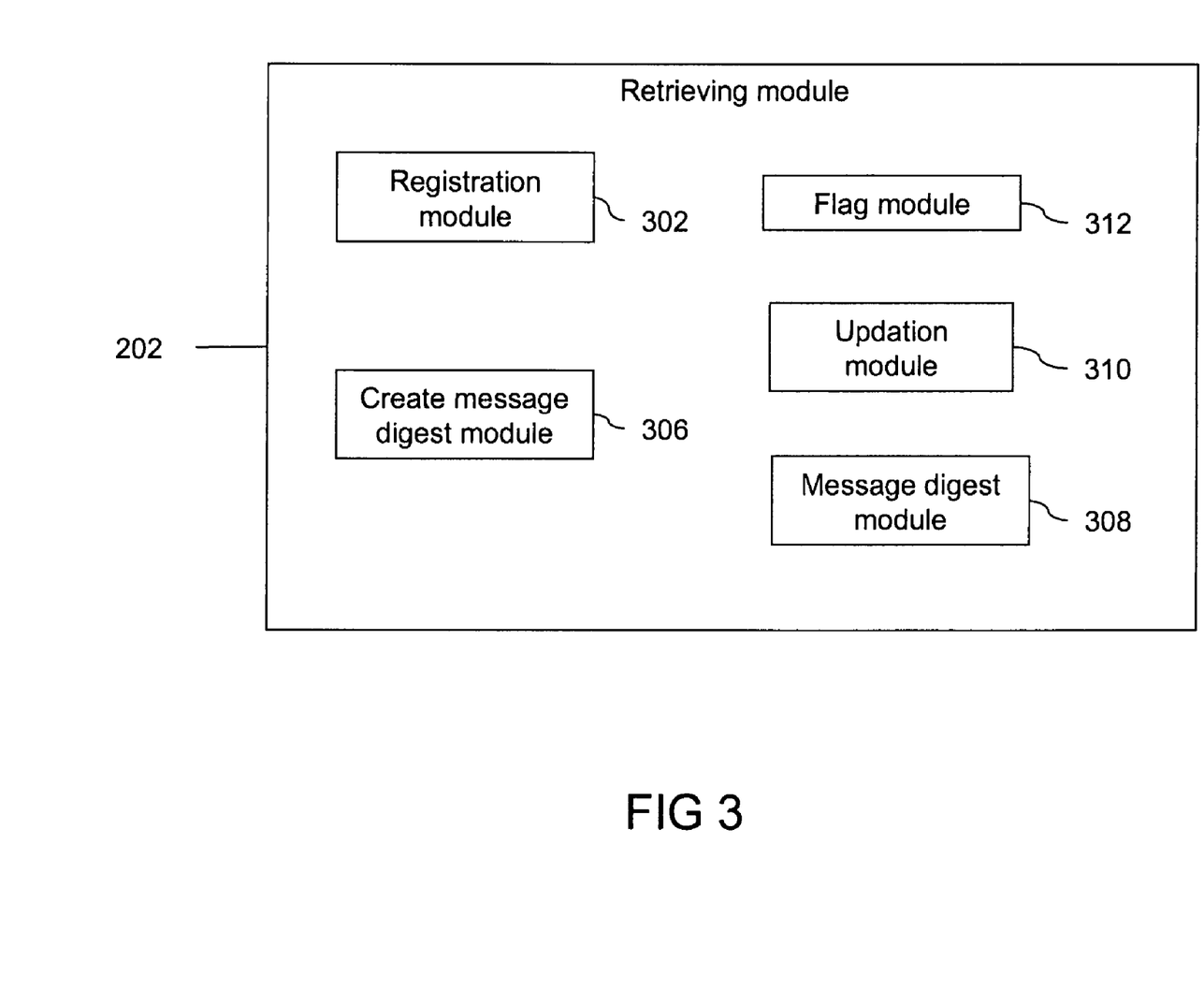
FIG. 3 is a schematic block diagram of the retrieving module, in accordance with an embodiment of the invention.

FIG. 3 depicts a block diagram of retrieving module 202 and its various modules. Retrieving module 202 comprises a registration module 302, a create message digest module 306, a message digest module 308, a flag module 312 and an updation module 310. Registration module 302 is a means for registering a set of Object Identifiers (OIDs) associated with device 102. NMS 104 includes the inventory module 304 which stores the values for the OIDs that the NMS 104 requires for managing the device 102. Create message digest module 306 computes the message digest on the basis of the stored values of the set of OIDs. Message digest module 308 stores the message digest.

In accordance with an embodiment of the invention, the message digest is calculated by using an MD5 algorithm. In an embodiment, MD5 algorithm, as described in a published paper titled 'The MD5 Message Digest Algorithm' and authored by the network working group 'R. Rivest' of MIT Laboratory for Computer Science and RSA Data Security Inc. in April 1992, and fully incorporated herein by reference thereto as if repeated verbatim immediately hereinafter, is used for computation of message digest. The MD5 algorithm takes a message of arbitrary length as input and produces a 128-bit message digest as output. The probability of two messages having the same message digest is essentially non-existent. Hence, they may be used to uniquely identify the devices on network 100.

In accordance with an embodiment of the invention, the inputs to the MD5 algorithm include the set of OIDs stored in inventory module 304. The inputs required for computing the message digest comprises MIB data. As previously indicated, the management information base (MIB) is a formal description of a set of network objects that may be managed using the Simple Network Management Protocol (SNMP). The format of the MIB may be defined as part of the SNMP. The inputs are retrieved by using keywords, such as 'at' and 'interfaces' occurring in multiple queries sent by NMS 104. For example, in an embodiment, 'interfaces' is referred by OID (1.3.6.1.2.1.2) and 'at' is referred by OID (1.3.6.1.2.1.3). More examples of such OIDs are ifDescr, ifIndex, ifType, ifSpeed, ifPhysAddress, atNetAddress, sysDesc and sysOID. Retreiving module 202 is part of the NMS 104. The flag module 312 may be part of the device 102.

Retrieving module 202 in combination with the flag module 312 may to monitor a change in the values of the set of OIDs associated with device 102. The change in the values of the set of OIDs may include addition or removal of at least one OID associated with device 102. The changes in the values of the set of OIDs are then notified to interested NMS 104 on network 100. The notification is performed at updation module 310 that notifies at least one NMS 104 about the changes by sending messages such as trap, inform, syslog to at least one NMS 104. It is to be noted that the message digest for the device 102 is re-computed in case there is a change in the values of the set of OIDs.

Figure 4:
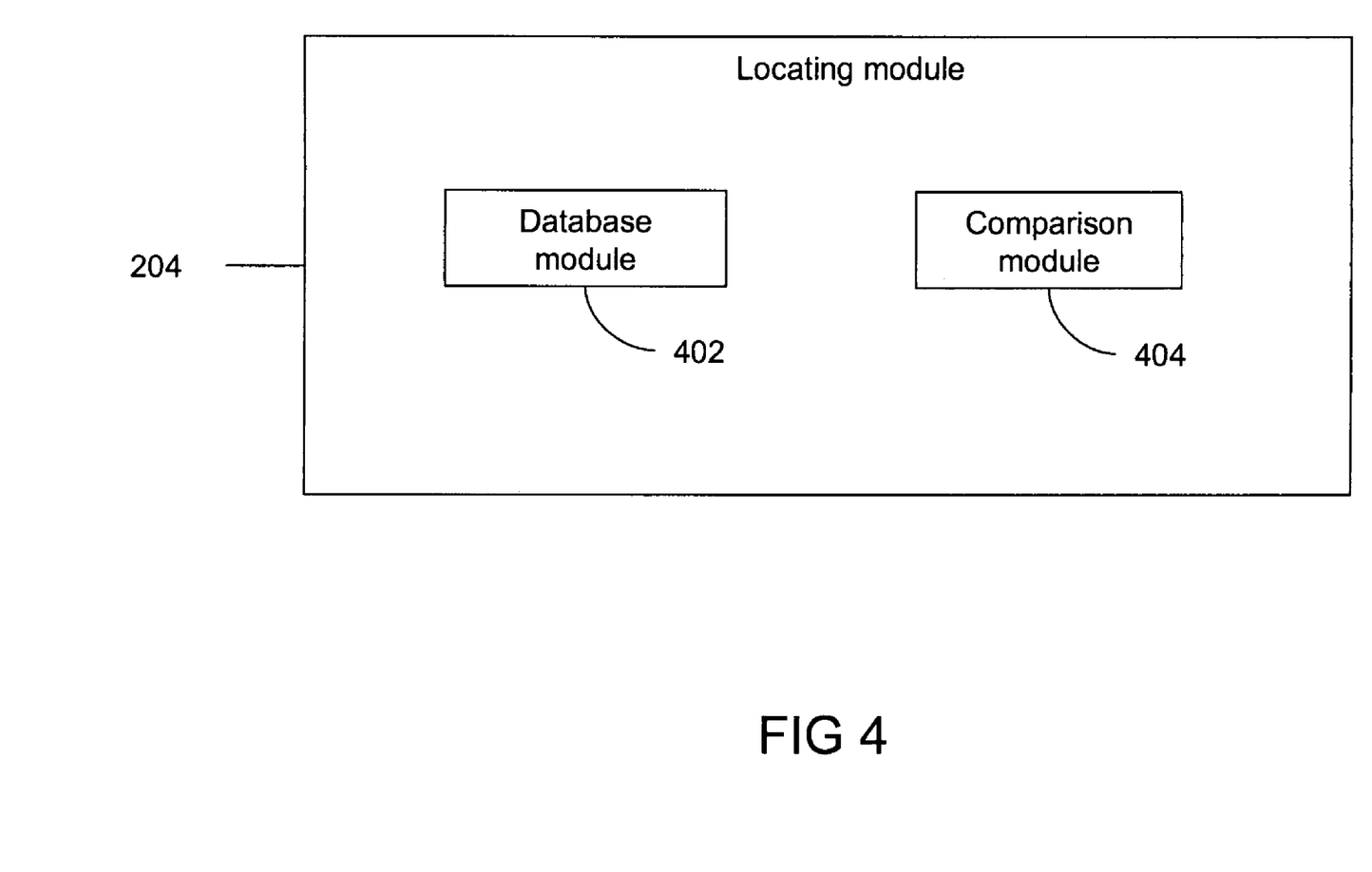
FIG. 4 is a schematic block diagram of the locating module, in accordance with an embodiment of the invention.

FIG. 4 depicts a block diagram of locating module 204. Locating module 204 comprises a database module 402 and a comparison module 404. Database module 402 maintains a database of the message digests for at least one device 102 that is being managed by NMS 104. Database module 402 is updated every time NMS 104 adds a new device 102 to the list of managed devices 102. Comparison module 402 compares the retrieved message digest with the message digests available in database module 402 in order to identify whether device 102 is an alias or not. In accordance with an embodiment, database module 402 and comparison module 404 reside in NMS 104.

Figure 5:
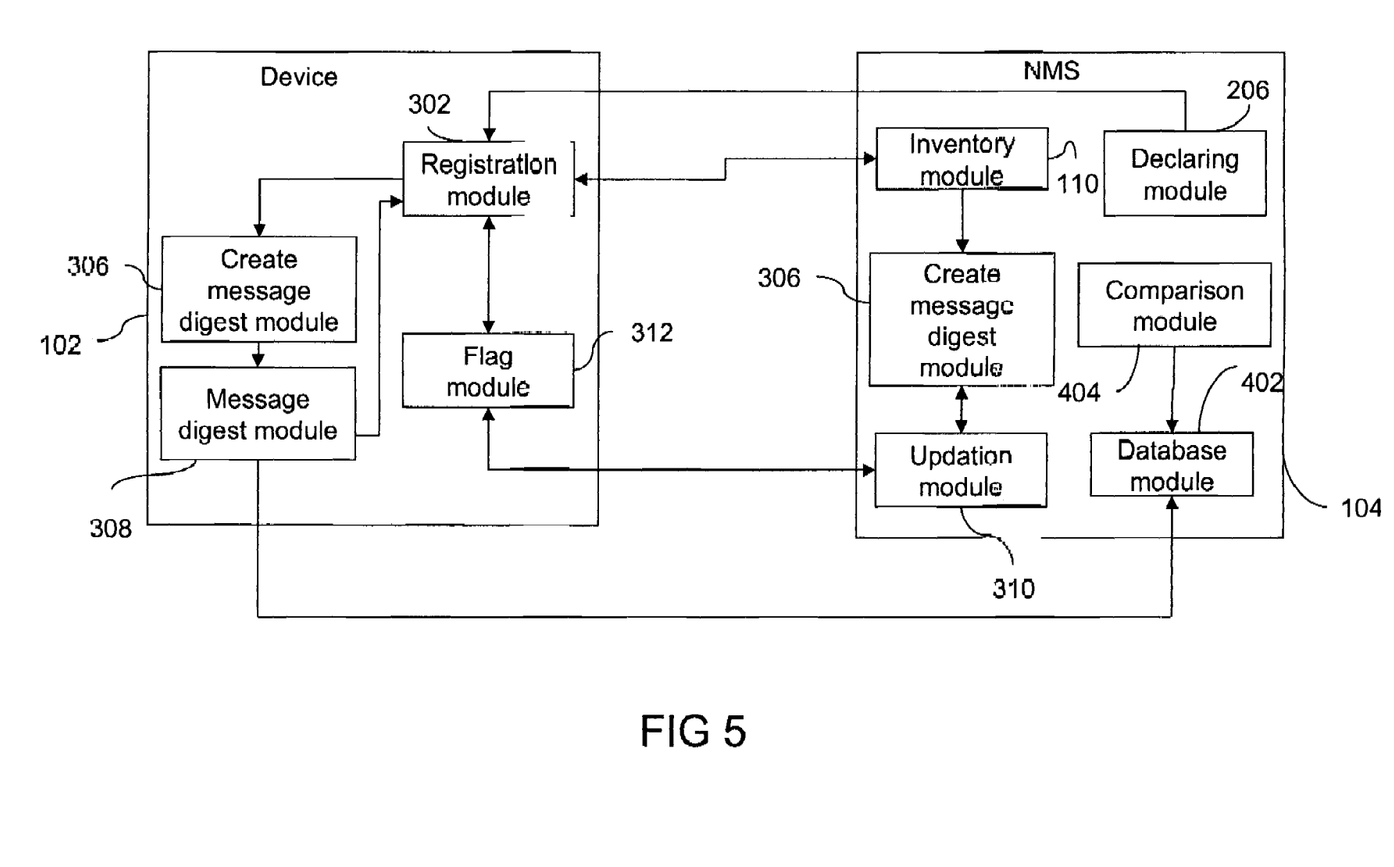
FIG. 5 is a schematic block diagram depicting interactions between a device and a NMS, in accordance with an embodiment of the invention.

In accordance with an embodiment of the invention, the different modules or system elements as described above reside within device 102 and NMS 104 as shown in FIG. 5. The arrows in FIG. 5 represent the direction of communication from one module of system element to another module of system element. In an embodiment, device 102 comprises registration module 302, create message digest module 306, message digest module 308, and flag module 312. NMS 104 comprises inventory module 304, create message digest module 306, database module 402, comparison module 404, updation module 310 and declaring module 206. NMS 104 also includes retrieving module 202. Inventory module 304 is responsible for interacting with the device 102 and collecting the data required for managing the device 102.

Create message digest module 306 is located on device 102, as well as NMS 104. This enables both device 102 and NMS 104 to compute the message digest for device 102 by using the values of the same set of OIDs. The computing of the message digest ensures accuracy in detection of aliases in network 100 in cases where variant inputs are used to compute the message digest. Registration is understood by both the NMS 104 and the device 102. NMS 104 knows the list of OIDs that it needs to register with the device 102. The devices 102 have the capabilities and the know-how to manage the list of OIDs. Thus, the device 102 and the NMS 104 compute the message digest on values for the same set of OIDs. Since these values are not static and can change on the device 102 over a period of time, it becomes necessary that both the device 102 and the NMS 104 work in combination to compute the message digest.

In accordance with an embodiment of the invention, interaction between the various modules as shown in the FIG. 5 is based on Simple Network Management Protocol (SNMP). As previously mentioned, the arrows in FIG. 5 represent the direction of communication from one module of system element to another module of system element. The interaction based upon the SNMP may be described as follows. NMS 104 generates an SNMP get request for the message digest and sends the request to message digest module 308. A new MIB element called MsgDigestCreateMIB (e.g., ciscoMsgDigestCreate) element is created. The NMS places an SNMP set request to the device 102. This would be an instruction to the device 102 to compute the message digest. The device 102 would then retrieve the OIDs that were registered to it by the NMS 104 and then retrieve the values for all these OIDs and compute the message digest on these values and store the result in the MsgDigest MIB element. The NMS 104 would place an SNMP request to get the value for this MIB element.

With respect to creating the MsgDigestCreate MIB element, any suitable specific procedure may be followed to create a MIB element and associate it with a specific MIB. For the purposes of embodiments of the invention, it may be assumed that MsgDigestCreate variable and MsgDigest variables are available. The NMS 104 would do an SNMP set on MsgDigestCreate variable to instruct the device 102 to compute the message digest. The device 102 on completing the computation would store the result (i.e., the message digest) in the MsgDigest variable. The NMS 104 would place an SNMP "get" request against the MsgDigest variable to retrieve the value for the message digest.

Message digest module 308 returns the message digest if the message digest is available with device 102. However, in case the message digest is not available with device 102, message digest module 308 retrieves a set of OIDs associated with device 102 from registration module 302. The set of OIDs may be stored in inventory module 304, and may be sent across to create message digest module 306 located on NMS 104 to compute the message digest by using the received set of OIDs. NMS 104 broadly generates another SNMP variable, msgdigestcreate, at create message digest module 306. The variable msgdigestcreate is sent to create message digest module 306 located on device 102. More specifically, the NMS 104 does an SNMP set on the MsgDigestCreate MIB variable on the device 102, which would instruct the device 102 to compute the message digest on the set of OIDs it retrieved from the registration module 302. The device 102 would compute the message digest and store the result in the MsgDigest MIB variable on the device 102. The NMS 104 would place an SNMP "get" on MsgDigest MIB variable to retrieve the value from the device 102. Thus, the MsgDigestCreate MIB variable instructs device 102 to compute the message digest by using the received set of OIDs. The computed message digest is subsequently sent to comparison module 404 to detect aliasing.

Comparison module 404 sends the comparison result to declaring module 206. Declaring module 206 declares device 102 as an alias if the comparison result is positive, i.e., the message digest is located on database module 402. However, if the comparison result is negative, i.e., the message digest is not available in database module 402, declaring module 206 sends a request to database module 402 to update the database by including the computed message digest. After the updating, NMS 104 starts managing device 102.

In case there is a change in the set of OIDs associated with device 102, flag module 312 identifies the change in the set of OIDs and raises a flag for each NMS 104 interested in device 102. It is to be understood that every device 102 on the network 100 is configured to send syslog messages, traps, etc., to known destinations. The known destinations may be Network Management Stations. If the device 102 is configured to send syslogs, traps, etc., to more than one NMS 104, then it would mean that more than one NMS 104 is interested in managing the device 102.

As a result of the change in the set of OIDs for device 102, create message digest module 306 re-computes the message digest for device 102. Updation module 310 sends a syslog-message to all interested NMS 104 thereby updating them about the re-computed message digest. Sending a syslog message would tell the NMSs 104 about a change, which may be termed "an event." The message would not contain the message digest itself. A re-sync mechanism will kick-over and the NMS 104 would re-compute the message digest. Each NMS 104 updates the database of message digests at database module 402. The re-sync mechanism has been captured in FIG. 9 and will be described hereinafter when referencing FIG. 9.

Each module, as described above, can be implemented as hardware or a combination of hardware and software. In an embodiment, each of the modules is implemented as one or more program instructions in a computer readable language and capable of performing the functions described. Further, the working of the invention has been described by using SNMP for the purpose of illustration only. Any other network management protocol can also be used without diverting from the scope and spirit of the invention.

Figure 6:
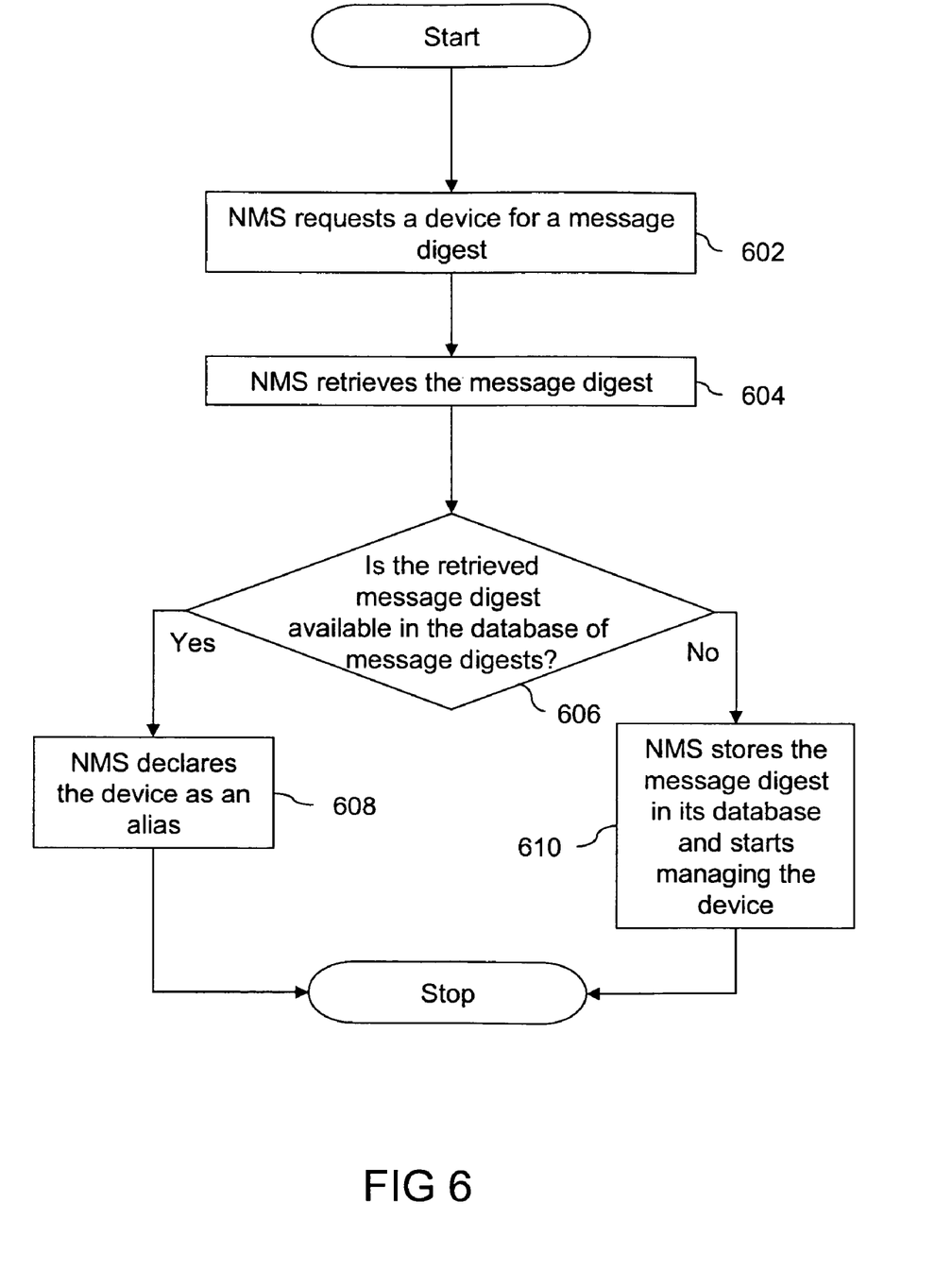
FIG. 6 is a flowchart depicting an overview of the method of detecting aliases in the network, in accordance with an embodiment of the invention.

FIG. 6 is an exemplary flowchart providing an overview of the method of detecting aliases in network 100. At step 602, NMS 104 requests device 102 for a message digest in response to the submission of device 102 to NMS 104 for management. At step 604, retrieving module 202 retrieves the message digest from device 102. The step of retrieving the message digest has been structured separately depending on the availability of the message digest with device 102. The different cases involved in carrying out the step 604 have been described, with the help of the flowcharts provided in FIG. 7, FIG. 8 and FIG. 9. Once the message digest is retrieved, locating module 204 performs a check for the message digest in database module 402, as shown at step 606. At step 608, declaring module 206 declares device 102 as an alias if the retrieved message digest is located on database module 402. However, if the message digest is not located on database module 402, NMS 104 stores the message digest in database module 402 and initiates management of device 102, at step 610.

Figure 7:
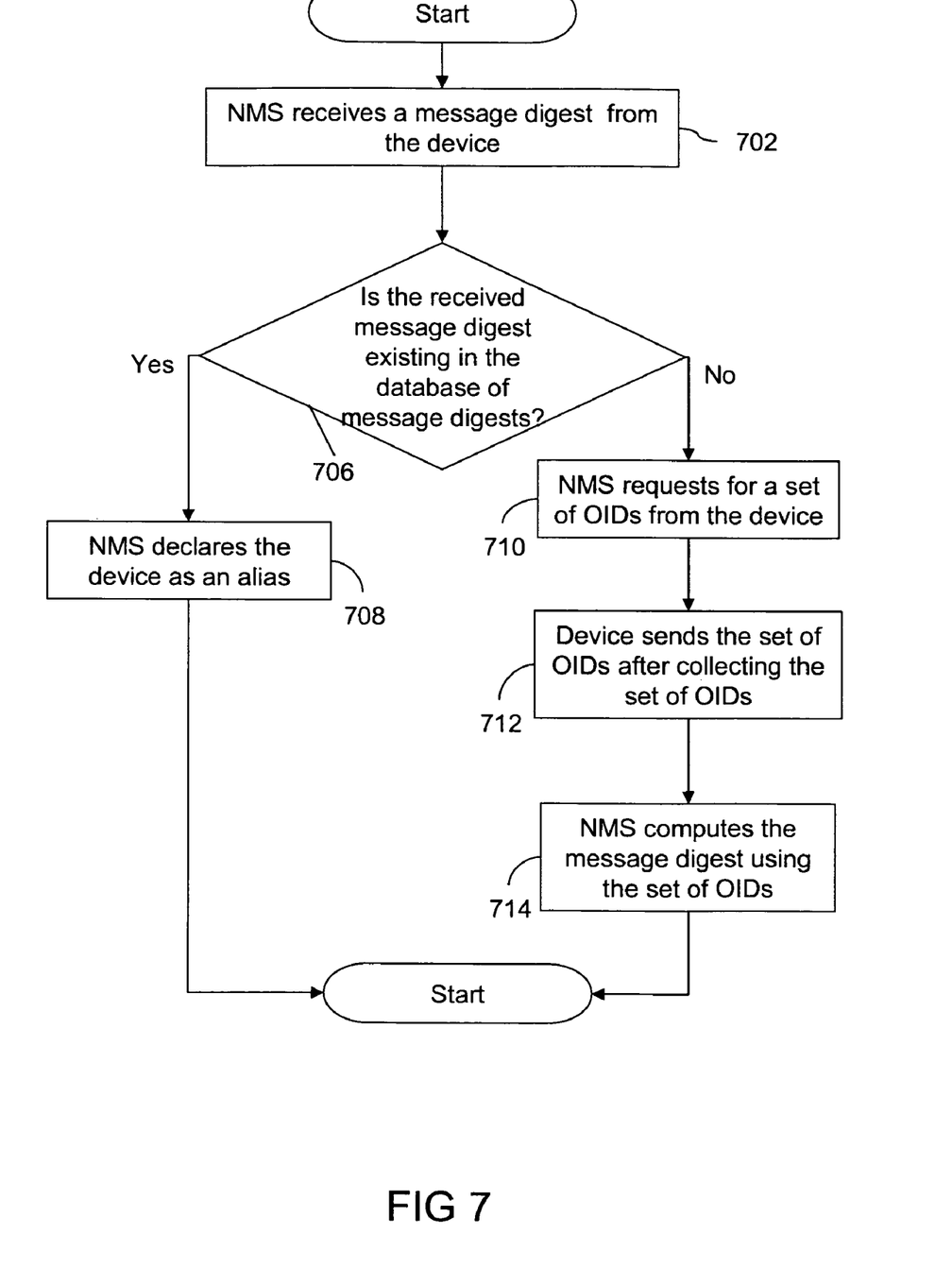
FIG. 7 is a flowchart depicting a method of retrieving a message digest, in case the message digest is available in the device, in accordance with an embodiment of the invention.

With reference to FIG. 6 again, at step 604 retrieving module 202 retrieves the message digest. There may be a case when the message digest is already available with device 102. FIG. 7 is a flowchart providing a method of retrieving message digest from device 102 that already carries the message digest. At step 702, NMS 104 receives the message digest that is available with device 102. At step 706, comparison module 404 performs a check for the received message digest in the database module 402. At step 708, declaring module 206 declares device 102 as an alias in case the received message digest is located on database module 402. However, in case the received message digest is not located on database module 402, NMS 104 requests for registering a set of OIDs associated with device 102 at registration module 302, as shown at step 710. More specifically, the NMS 104 requests the device 102 to provide the OIDs that were registered to compute the message digest. The registration would have happened previously by an NMS 104 that initially managed the device 102. At step 712, device 102 sends the registered set of OIDs to NMS 104. At step 714, create message digest module 306 located on NMS 104, computes the message digest on the basis of the received set of OIDs (i.e., on the basis of the values of the received set of OIDs).

Figure 8:
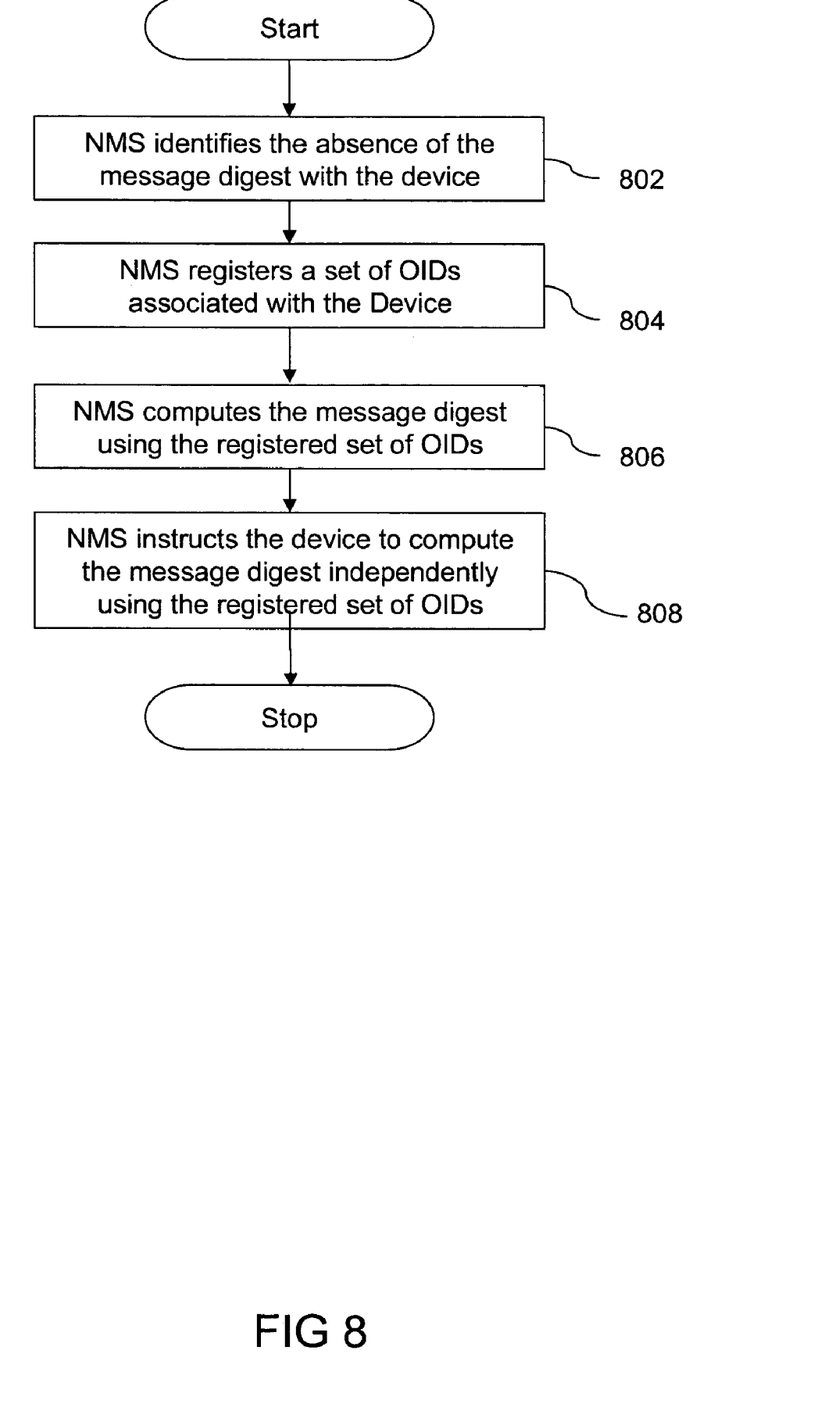
FIG. 8 is a flowchart depicting a method of retrieving a set of OIDs from a device for computation of a message digest, in the event that the message digest is not available in the device, in accordance with an embodiment of the invention.

Referring again now to FIG. 6 and as previously indicated, at step 604 retrieving module 202 retrieves the message digest. There may be a case when the message digest is not available with device 102. FIG. 8 is a flowchart providing a method of retrieving the message digest in such a situation. At step 802, device 102 identifies the absence of the message digest. At step 804, NMS 104 registers a set of OIDs associated with device 102. NMS 104, after registering the set of OIDs, computes the message digest (based on the values of the OIDs) in the create message digest module 306 located on NMS 104, as shown at step 806. At step 808, NMS 104 instructs device 102 to compute the message digest using the registered set of OIDs.

Another case for retrieving message digest occurs when the message digest is required to be updated due to a change in the set of OIDs associated with device 102. The change in the set of OIDs is a result of the inclusion or deletion of an interface from device 102. Another reason is if the software image on the device 102 is upgraded or downgraded.

Figure 9:
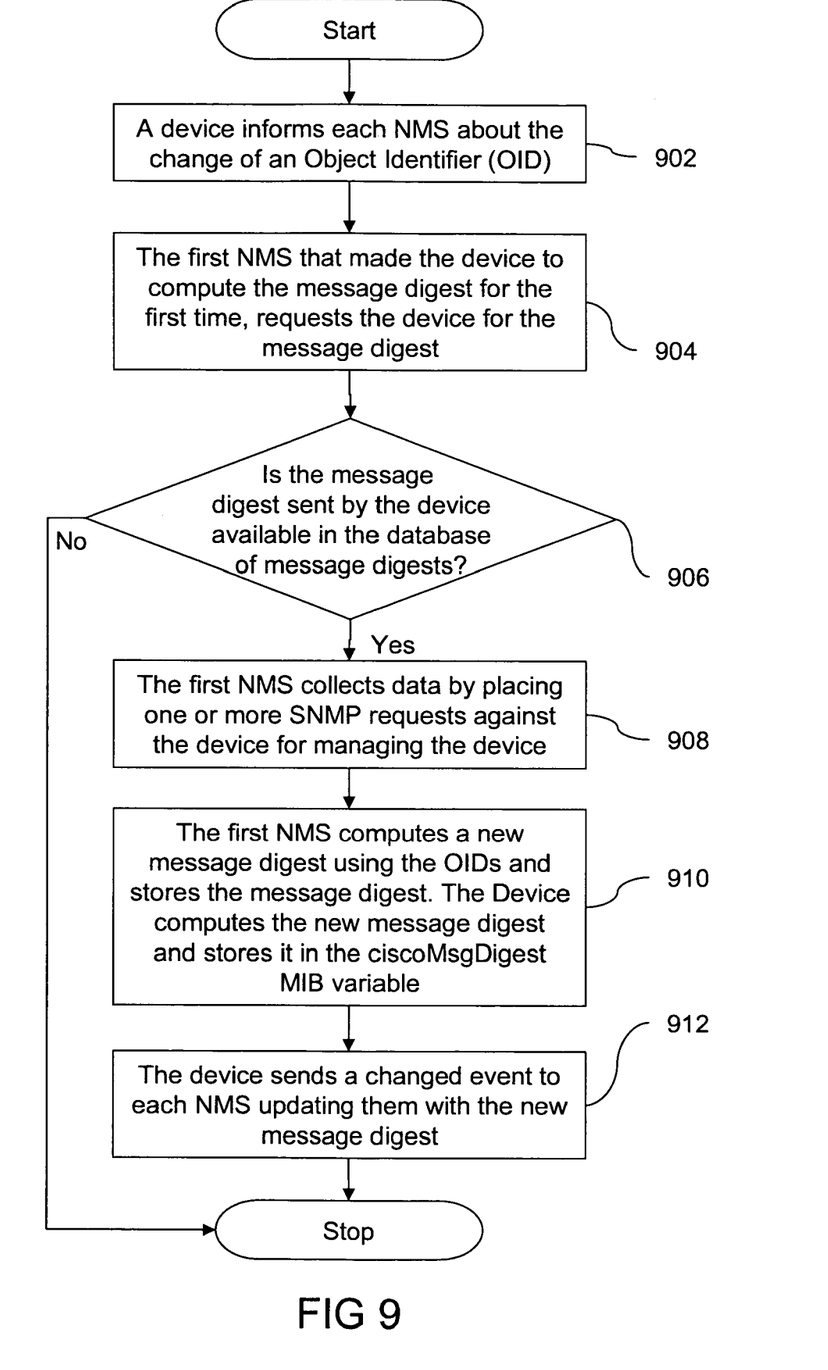
FIG. 9 is a flowchart describing a method of retrieving an updated message digest, in accordance with an embodiment of the invention.

FIG. 9 is a flowchart for retrieving the updated message digest. At step 902, flag module 312 raises a flag after identifying the change in the values stored for the set of OIDs. The flagged message goes to at least one NMS 104. In response to the flagged message, a first NMS 104, which requested device 102 to compute the message digest for the first time, requests device 102 for the message digest, as shown at step 904. Comparison module 404 compares at step 906 the received message digest with the message digest available in database module 402. At step 908, if the message digest is located within database module 402, first NMS 104 collects data by placing one or more SNMP requests against the device for managing the device and/or builds or collects an inventory of OIDs by registering the changed values in the set of OIDs. The first NMS 104 simply goes about recollecting all the data required for managing the device 102. "Inventory collection" means collecting data required for managing the device 102. At step 910, the NMS 104 would instruct the device 102 to compute the message digest by doing an SNMP set on the MsgDigestCreate MIB variable. The device 102 would compute the message digest and store the result in the MsgDigest MIB variable. The NMS 104 would compute the message digest at its end. At step 912, since there is a change in the message digest, the device 102 would send out a message to each NMS 104 updating them about a change. Each NMS 104 would then update the message digests, as previously discussed and suggested in the discussion referencing FIG. 7. Updation module 310 sends a syslog message to all NMS 104 available in the network by updating them about the updated message digest. The updated message digest is subsequently used to detect the aliasing.

An advantage of the embodiment of the invention is accurate detection of aliases in the network. As has already been described, the NMS 104 and the device 102 compute the message digest associated with the device 102 independently. The dual-computation of the message digest avoids any chance of error in detecting aliases and ensures an accurate detection of aliases in the network even if a variant set of OIDs is used to compute the message digest. It is to be understood that the data values of the OIDs are variant, not the OIDs themselves. Hence, dual computation of hash becomes necessary.

Another advantage of the invention is the efficiency in operation, which leads to a reduction in the time required to detect an alias. The invention avoids comparison of a plurality of parameters by checking for an alias based upon a single parameter, which is unique to each device. Additionally, the invention avoids collection of parameters for the set of OIDs every time a device submits itself for management. In accordance with an embodiment of the invention, the NMS 104, which receives the request for management from the device 102, compares the message digest and only in case the message digest is not available in its database, initiates collection of OIDs from the device for computation of message digest.

The message digest can also be utilized randomly, when a management operation is being performed, to ensure that communication is taking place with the same device and a man-in-middle has not taken over the communication session. For example, NMS 104 stores the message digest associated with each device 102, thereby identifying each device that is being managed by NMS 102. If the man-in-middle tries to attack the network by assuming the identity of a device in the network, NMS 104 compares the message digest of the man-in-middle with the database of message digests. NMS 104 declares that device 102 has been attacked by the man-in-middle if the message digest of the man-in-middle is not available with in the database.

By the practice of various embodiments of the invention, the message digest computation happens inside the device 102 and at the NMS 104 also. Thus, computation of the message digest happens at both the places. Assuming that there is no message digest available at both the NMS 104 or the device 102, a network administrator physically seated at the station of the NMS 104 submits a device 102 in his/her network to be managed. The NMS 104 has elaborate knowledge of which OID values it needs to collect from the device 102 in order to manage it. The NMS 104 queries the device 102 for OID values by placing one or more SNMP queries and stores the data in its database. The NMS 104 has retrieved the data it requires and it calculates the message digest at its end independently. The NMS 104 registers a set of OIDs inside the device 102 in a MIB, such as the CISCO-EVENT-MIB. This step is the one which would let the device 102 know which OIDs and corresponding values needs to be used for the message digest computation. The NMS 104 would set the MsgDigestCreate MIB variable (a newly defined one, such as the ciscoMsgDigestCreate MIB) which would trigger the device 102 to compute the message digest at its end, by getting the list of OIDs from the MIB (e.g., the CISCO-EVENT-MIB) and associated values. The message digests created at the NMS end and inside the device 102 would be exactly the same as these have been computed on OID values for the same set of OIDs. This one-to-one correspondence is what determines whether a device 102 is an alias or not.

In further practice of various embodiments of the present invention, changes may occur on the device 102. The MIB (e.g., the CISCO-EVENT-MIB) continually monitors the list of OIDs that have been registered with it. If the values for any of these change, then the device 102 would send out syslogs, traps, or informs the NMSs 104 configured on the device 102. The NMSs 104 on receiving the message detect that the values have changed and that the message digests need to be re-calculated by both the device 102 and the NMSs 104 to be in sync again. The NMS 104 would re-collect inventory data and calculate message digest, all as previously described above with respect to the procedure having the assumption that there is no message digest available at both the NMS 104 and the device 102. As also previously described above with respect to the procedure having the assumption that there is no message digest available at both the NMS 104 or the device 102, certain procedural steps through the re-synchronization mechanism are repeated for synchronization purposes. More specifically, and as previously mentioned above, the NMS 104 would subsequently set the MsgDigestCreate MIB variable (a newly defined one, such as the ciscoMsgDigestCreate MIB) which would trigger the device 102 to compute the message digest at its end by getting the list of OIDs from the MIB (e.g., the CISCO-EVENT-MIB) and associated values. The message digests created at the NMS end and inside the device 102 would be exactly the same (i.e., synchronized) as these have been computed on OID values for the same set of OIDs. This one-to-one correspondence is what determines whether a device 102 is an alias or not.

Although the invention has been discussed with respect to specific embodiments thereof, these embodiments are merely illustrative, and not restrictive, of the invention. For example, a "NMS" can include any type of analysis, manual or automatic, to anticipate the needs of a network at a time of network operation. A network control system or management service can be any type of control used at a time of operation to reconfigure or modify a network or to otherwise allocate network resources. A network resource can implicate any type of network performance characteristic such as bandwidth (e.g., physical or virtual links or channels; time division, code division, frequency division or other multiplexing or sharing of lines, etc.), signal conversion and/or interfacing, processing resources (e.g., CPU cycles, memory capacity, storage, input/output ports or other resources, etc.), network storage, buffering or other network resources.

Although specific protocols have been used to describe embodiments, other embodiments can use other transmission protocols or standards. Use of the terms "peer," "client" and "server" can include any type of device, operation or other process. The present invention can operate between any two processes or entities including users, devices, functional systems or combinations of hardware and software. Peer-to-peer networks and any other networks or systems, where the roles of client and server are switched, change dynamically, or are not even present are within the scope of the invention.

Any suitable programming language can be used to implement the modules of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for detecting aliases in a network having a plurality of devices, the method comprising:

receiving a request from a device having a message digest, the message digest computed based on values for a set of object identifiers (OIDs) associated with the device, the OIDs being identifiers for describing the devices in a network management system (NMS);

receiving a message including the message digest from the device and not the values for the set of OIDs;

determining if the received message digest in the message is found in a database of message digests; and determining the device as an alias if the received message digest is found in the database of message digests, the determination of the alias using the message digest without comparing values for the set of OIDs, the alias being when the device has already been registered and the values for the OIDs do not need to be downloaded and registered from the device; and downloading the values for the OIDs if the message digest is not found in the database of message digests.

2. A method for detecting aliases in a network having a plurality of devices and at least one Network Management System (NMS) for managing the devices, the method comprising:

requesting a device having a message digest computed from values for a set of Object Identifiers (OIDs) associated with the device, the OIDs being identifiers for describing the devices in the at least one NMS;

retrieving a message including the message digest from the device and not the values for the set of OIDs;

locating the retrieved message digest in a database of stored message digests; and declaring the device as an alias since the retrieved message digest is located in the database, the determination of the alias using the message digest without comparing values for the set of OIDs, the alias being when the device has already been registered and the values for the OIDs do not need to be downloaded and registered from the device; and downloading the values for the OIDs if the message digest is not found in the database of message digests.

3. The method of claim 2, wherein the retrieving the message digest from the device comprises:

registering the set of OIDs associated with the device;

sending the registered set of OIDs to a requesting NMS; and computing the message digest using the values of the set of OIDs.

4. The method of claim 2, wherein the retrieving the message digest comprises retrieving the message digest when there is a change in value of at least one OID belonging to the set of OIDs.

5. The method of claim 4 wherein said retrieving the message including the message digest when there is a change in value of at least one OID belonging to the set of OIDs comprises:

informing each NMS in the network about the change in the value of the set of OIDs associated with the device;

requesting the device for the list of OIDs on whose values the message digest is to be computed;

computing the message digest using the changed values of the set of OIDs; and updating the database of each NMS that stores the message digest of the device with the computed message digest.

6. The method of claim 5 further comprising the step of adding the message digest in the database when the retrieved message digest is not found in the database.

7. The method of claim 6, wherein the adding the message digest in the database comprises obtaining the set of OIDs;

obtaining values for the set of OIDs;

computing the message digest using the values of the set of OIDs; and storing the computed message digest in the database belonging to a requesting NMS.

8. The method of claim 2, wherein the communication between the device and the NMS is based on a Simple Network Management Protocol (SNMP).

9. A method for detecting an attack on a network having a plurality of devices and at least one Network Management System (NMS) for managing the devices, the method comprising:

assigning a message digest to each device, the message digest being an identifier for the device, the assigning being performed by the NMS in coordination with each device, the message digest computed based on values associated with one or more OIDs associated with each device, the OIDs being identifiers for describing the devices in the at least one NMS;

retrieving a message including the message digest from a device and not the values for the set of OIDs;

locating the retrieved message digest in a database of message digests, the locating being performed by the NMS; and declaring the device as being attacked if the retrieved message digest cannot be located on the database, the declaring being performed by the NMS, the declaring being determined using the message digest without comparing values for the set of OIDs, the declaring determined because the device has been registered and the values for the OIDs do not need to be downloaded and registered from the device; and downloading the values for the OIDs if the message digest is not found in the database of message digests.

10. The method as recited in claim 9, wherein the assigning the message digest to the device comprises sending a set of object identifiers (OIDs) associated with the device to the NMS, the sending being performed by the device; and computing the message digest using the values of the set of OIDs, the computing being performed by the NMS.

11. A method for detecting aliases in a network having a plurality of devices and at least one Network Management System (NMS) for managing the plurality of devices, the method comprising:

requesting a device for a set of Object Identifiers (OIDs) associated with the device, the requesting being performed by an NMS;

computing a message digest using values of the set of OIDs, the message digest being an identifier to the device, the computing being independently performed by the device and the requesting NMS, the OIDs being identifiers for describing the plurality of devices in the at least one NMS;

assigning the message digest to the device, the assigning being performed by the requesting NMS;

retrieving a message including the message digest from a device and not the values for the set of OIDs;

locating the assigned message digest in the database of message digests, the locating being performed by the requesting NMS; and declaring the device as an alias if the assigned message digest is located on the database, the declaring being performed by the requesting NMS, the declaring of the device as the alias using the message digest without comparing values for the set of OIDs, the alias being when the device has already been registered and the values for the OIDs do not need to be downloaded and registered from the device; and downloading the values for the OIDs if the message digest is not found in the database of message digests;

wherein the steps of the locating the assigned message digest and the declaring the device are performed whenever the device is submitted for management to at least one NMS.

12. The method of claim 11 additionally comprising registering with the NMS the set of OIDs with the device; conducting an SNMP set on a MsgDigestCreate variable to instruct the device to compute the message digest; computing the message digest by the device and storing the computed message digest in an MIB variable; and computing the message digest by the NMS.

13. A system for detecting aliases in a network having a plurality of devices and at least one Network Management System (NMS), each device being identified with a message digest, the system comprising
- a receiving module for receiving a request from a device having a message digest, the message digest computed based on values for a set of object identifiers (OIDs) associated with the device, the OIDs being identifiers for describing the devices in a network management system (NMS);
- a retrieving module for receiving a message including the message digest from a device and not the values for the set of OIDs;
- a locating module for determining if the retrieved message digest is found in a database of message digests; and
- a declaring module for declaring the device as an alias if the retrieved message digest is found in the database of message digests, the declaring being determined using the message digest without comparing values for the set of OIDs, the alias being when the device has already been registered and the values for the OIDs do not need to be downloaded and registered from the device; and
- a registration module for downloading the values for the OIDs if the message digest is not found in the database of message digests.

14. The system as recited in claim 13, wherein the retrieving module comprises
- a registration module for registering the set of Object Identifiers (OIDs) associated with the device, the set of OIDs being used for computation of the message digest, the OIDs being identifiers for describing the devices in the at least one NMS;
- a create message digest module for computing the message digest using the stored set of OIDs;
- a message digest module for storing the computed message digest;
- a flag module for identifying a change in the value of an OID belonging to the set of OIDs; and
- an updation module for updating each NMS about the change in the values of the set of OIDs.

15. The system of claim 14 wherein said NMS comprises an inventory module for storing the set of OIDs.

16. The system as recited in claim 13, wherein the locating module comprises
- a database module for storing message digests of zero or more devices on the network; and
- a comparison module for comparing the retrieved message digest with the message digests stored in the database module.

17. A system for detecting aliases in a network, the system comprising
- at least one device; each device comprising
  - a registration module for registering a set of Object Identifiers (OIDs) associated with the device;
  - a create message digest module for computing the message digest based on values for the stored set of OIDs, the OIDs being identifiers for describing devices in the at least one NMS;
  - a message digest module for storing the computed message digest as an MIB variable;
  - a flag module for identifying a change in the value of an OID belonging to the set of OIDs;
  - an updation module for updating each NMS about the change in the value for any of the set of OIDs;
- at least one Network Management System (NMS), each NMS comprising a database module for storing message digests of zero or more devices on the network;
  - an inventory module for storing the registered set of OIDs;
  - a comparison module for receiving a message including the message digest from the device and not the values for the set of OIDs and comparing the retrieved message digest with the message digests stored in the database; and
  - a declaring module for declaring the device as an alias if the retrieved message digest is located on the database of message digests, the declaring being determined using the message digest without comparing values for the set of OIDs, the alias being when the device has already been registered and the values for the OIDs do not need to be downloaded and registered from the device; and
  - a registration modules for downloading the values for the OIDs if the message digest is not found in the database of message digests.

18. The method of claim 1, wherein the OIDs are included in a management information base (MIB), the MIB being a formal description of the devices in the NMS.

* * * * *